US012771530B2

(12) United States Patent
Li et al.

(10) Patent No.: US 12,771,530 B2
(45) Date of Patent: Oct. 20, 2026

(54) TRUSTED, PRIVATE, VERIFIABLE AND TRACEABLE DATA FLOW METHOD AND SYSTEM

(71) Applicant: HEFEI UNIVERSITY OF TECHNOLOGY, Anhui (CN)

(72) Inventors: Meng Li, Anhui (CN); Yifei Chen, Anhui (CN)

(73) Assignee: HEFEI UNIVERSITY OF TECHNOLOGY, Anhui (CN)

( * ) Notice: Subject to any disclaimer, the term of this patent is extended or adjusted under 35 U.S.C. 154(b) by 56 days.

(21) Appl. No.: 19/026,705

(22) Filed: Jan. 17, 2025

(65) Prior Publication Data

US 2026/0172232 A1 Jun. 18, 2026

(30) Foreign Application Priority Data

Dec. 16, 2024 (CN) ......................... 202411847169.0

(51) Int. Cl.

*H04L 29/06* (2006.01)
*H04L 9/00* (2022.01)
*H04L 9/08* (2006.01)
*H04L 9/32* (2006.01)

(52) U.S. Cl.

CPC .......... *H04L 9/0825* (2013.01); *H04L 9/3236* (2013.01); *H04L 9/3247* (2013.01); *H04L 9/3263* (2013.01); *H04L 9/50* (2022.05)

(58) Field of Classification Search

CPC ..................................................... H04L 9/0825
See application file for complete search history.

(56) References Cited

U.S. PATENT DOCUMENTS 10,839,070 B1 * 11/2020 Wei ......................... G06F 21/71
2017/0075938 A1 * 3/2017 Black ..................... H04L 9/3239
2017/0352027 A1 * 12/2017 Zhang ................ G06Q 20/3678
2021/0021407 A1 * 1/2021 Weerasinghe ........ H04L 9/3218

* cited by examiner

*Primary Examiner* — Jason K Gee
(74) *Attorney, Agent, or Firm* — JCIPRNET

(57) ABSTRACT

The present invention discloses a trusted, private, verifiable and traceable data flow method and system, which are applied to an environment composed of a plurality of data usage modules, a cloud service module, a plurality of oracle modules, a plurality of data providing module modules and a blockchain platform. The system generates a system parameter and a key through the oracle modules and each module generates a parameter and a key thereof. The data providing modules upload data, and the data is forwarded to the cloud service module for storage after being verified for authenticity by the oracle modules. The data usage modules propose a data usage request, and a cloud service module responds by returning data after verification. After data leakage occurs, the cloud service module extracts the data watermark for accountability.

2 Claims, 1 Drawing Sheet

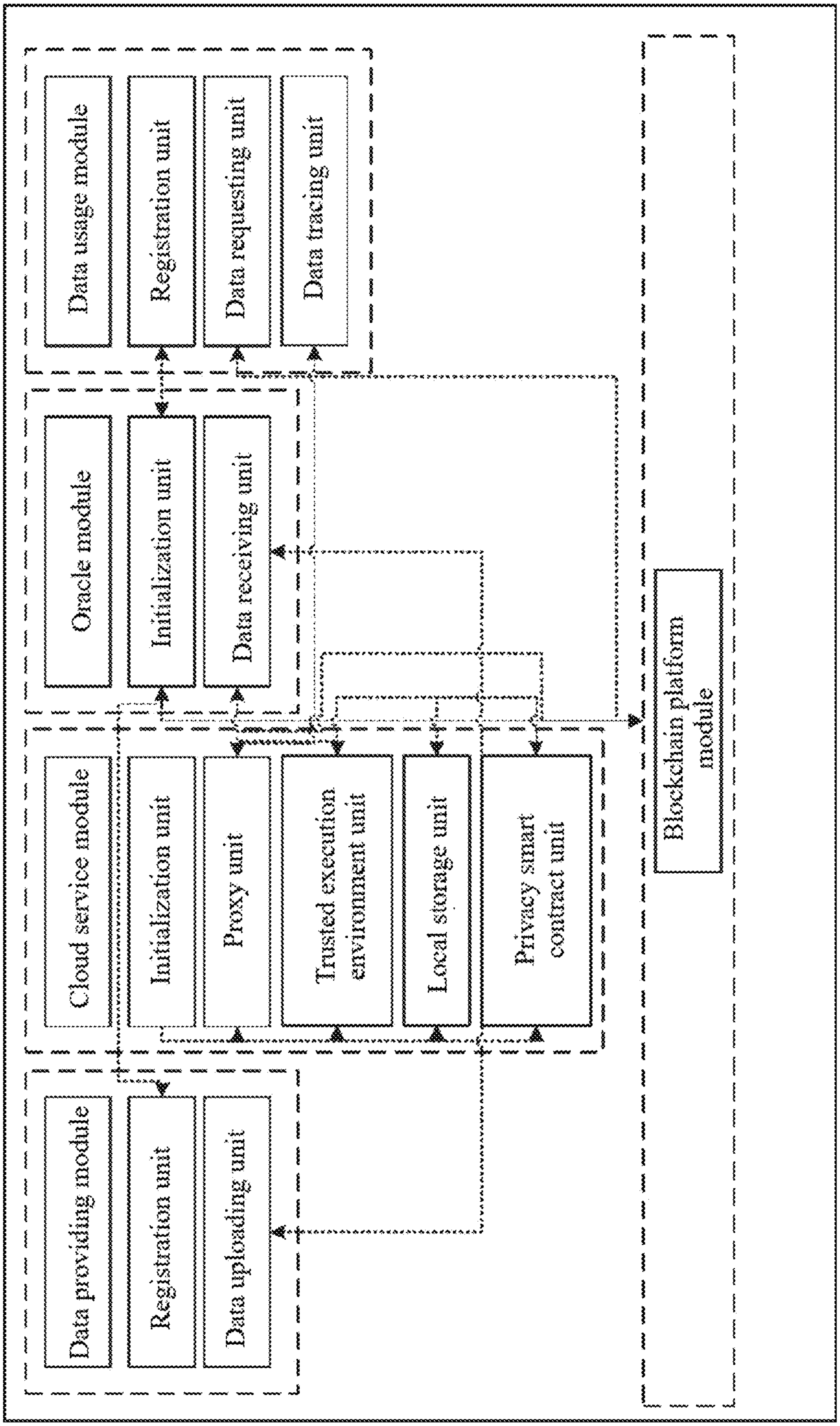
Data usage module
Registration unit
Data requesting unit
Data tracing unit
Oracle module
Initialization unit
Data receiving unit
Cloud service module
Initialization unit
Proxy unit
Trusted execution environment unit
Local storage unit
Privacy smart contract unit
Data providing module
Registration unit
Data uploading unit
Blockchain platform module

TRUSTED, PRIVATE, VERIFIABLE AND TRACEABLE DATA FLOW METHOD AND SYSTEM

CROSS-REFERENCE TO RELATED APPLICATIONS

This application claims priority to Chinese Patent Application No. 202411847169.0, filed on Dec. 16, 2024 and entitled "TRUSTED, PRIVATE, VERIFIABLE AND TRACEABLE DATA FLOW METHOD AND SYSTEM", which is hereby incorporated by reference in its entirety.

BACKGROUND

Technical Field

The present application relates to a trusted, private, verifiable and traceable data flow method and system, belonging to the technical fields of data security, trusted circulation of data elements and trusted computing.

Description of Related Art

Blockchain enables untrusted parties to reach consensus on data and activities by operating a consensus mechanism. These transactions are recorded in a series of blocks after being encrypted and signed, so as to form an ever-growing distributed ledger with characteristics such as decentralization, immutability, verifiability, and partial anonymity. Initially serving as the underlying technology of Bitcoin, the blockchain has now been widely applied in fields beyond finance, such as insurance, identity management, supply chain management, and digital forensics. Blockchain-based services have become an important technological route for constructing a decentralized trust system, where Ethereum, as one of the blockchains with the highest market value, has a significant advantage in supporting a smart contract. The smart contract is a self-executing code that runs on the Ethernet virtual machine, and is used to automatically execute transactions and manage trigger conditions according to a predefined logic.

In order to ensure continuous and reliable operation of the smart contract, Authenticated Data Flow (ADF) is crucial. Although the data on the blockchain has characteristics of immutability, verifiability, and privacy protection after being stored, the ADF, as a core task of blockchain data governance, is often ignored by many existing studies. On the other hand, the smart contract inherently has serious privacy issues, as the data and computation processes in the contracts are publicly broadcasted and visible in the blockchain network. To address these issues, numerous privacy protection systems and protocols based on encryption technology have been proposed. In scenarios such as data trading and digital forensics, the ownership and correct use of data are particularly critical.

The existing ADF mainly faces the following problems:

1. Data from untrusted data providers, as well as external data received by trusted servers, may still pose risks of fraud or deception. Meanwhile, crowd-sourced data from distributed data providers (e.g. human individuals or sensors) is often unreliable and may originate from anonymous entities.
2. When performing verifiable computation in an untrusted server environment, outsourcing data to the servers may cause data providers to lose control, and the untrustworthiness of the servers may cause data users to doubt the computation results.
3. Regarding the traceability issue for anonymous data users, malicious data users may obtain illegal data or share data with illegal users, thereby posing potential risks.

SUMMARY

In order to address the above-mentioned shortcomings in the prior art, the present invention proposes a trusted, private, verifiable and traceable data flow method and system, so as to solve data problems from untrusted data providers and enable verifiable computation under untrusted servers, thereby ensuring traceability of illegal data leakage.

In order to achieve the above invention objectives, the present invention adopts the following technical solutions.

A trusted, private, verifiable and traceable data flow system, including: a data providing module, a cloud service module, n oracle modules, a data usage module, and a blockchain platform module; and t oracle modules are selected from the n oracle modules as committee oracle modules respectively, where t represents a threshold value of the committee oracle modules and $t \in [1,n]$;

the data providing module includes a data providing registration unit and a data uploading unit;

the cloud service module includes a cloud service initialization unit, a proxy unit, a trusted execution environment unit, a local storage unit and a privacy smart contract unit;

each of the committee oracle modules includes an oracle initialization unit and a data receiving unit;

the data usage module includes a data usage registration unit, a data requesting unit and a data tracing unit;

the oracle initialization units of the t committee oracle modules initialize the blockchain platform module, including: setting up a consensus mechanism of the blockchain platform module; and at the same time, the i-th oracle initialization unit generates an asymmetric encryption key pair, a signature key pair and an ATS signature key pair of the i-th committee oracle module;

the cloud service initialization unit initializes the proxy unit, the trusted execution environment unit, the local storage unit and the privacy smart contract unit, including: setting a cloud service blockchain wallet, and generating a remote authentication key pair of the trusted execution environment unit, an asymmetric encryption key pair of the trusted execution environment unit, a signature key pair of the trusted execution environment unit and an index structure of the local storage unit;

the privacy smart contract unit registers with any one of the committee oracle modules to obtain a trusted verifiable computation key pair and a watermark key;

the data usage registration unit generates a data usage asymmetric key pair, obtains a digital certificate and an identity identifier after interacting with the oracle initialization unit of any one of the committee oracle modules, and sets up a data usage blockchain wallet at the same time;

the data providing registration unit generates a data providing asymmetric key pair, and obtains a verifiable computation key pair after interacting with any one of the oracle initialization units;

the data uploading unit determines whether held real data belongs to computable data or traceable data; and if the data is the computable data, a private key in the verifiable computation key pair is used to perform a verifiable computation signature on the held real data to obtain a verifiable computation signature, then a public key in the asymmetric encryption key pair of the committee oracle module is used to encrypt the held real data and the verifiable computation signature together to obtain the processed data; otherwise, the public key in the asymmetric encryption key pair of the committee oracle module is used to directly encrypt the held real data to obtain the processed data; so as to send the processed data to the data receiving unit;

the data receiving unit decrypts the received processed data by using a private key in the asymmetric encryption key pair of the committee oracle module, so as to obtain the decrypted data, and verify an authenticity of the decrypted data; and if the decrypted data is authentic, the decrypted data is stored as a data record and a public key in the asymmetric encryption key pair of the trusted execution environment unit is used to perform secondary encryption on the decrypted data, and then a private key in the signature key pair in the committee oracle module is used to sign the secondary encrypted data, so as to obtain one-time signature data, and then a private key in the ATS signature key pair of the committee oracle module is used to perform an ATS signature on the secondary encrypted data, thereby forming encrypted signature data together with the one-time signature data, which is then sent to the proxy unit; otherwise, the decrypted data is discarded;

the proxy unit verifies the encrypted signature data by using a public key in the signature key pair of the committee oracle module; and if the verification is successful, the encrypted signature data is forwarded to the trusted execution environment unit, and after the trusted execution environment unit decrypts the encrypted signature data using a private key in its own asymmetric encryption key pair, the real data is obtained and forwarded to the privacy smart contract unit; otherwise, the encrypted signature data is discarded;

after receiving at least t pieces of real data, the privacy smart contract unit generates a data ATS aggregation signature and a data aggregation public key and verifies the data ATS aggregation signature by using the data aggregation public key; and if the verification is successful, all real data is used to update the index structure of the local storage unit, and all real data is returned to the trusted execution environment unit; otherwise, at least t pieces of real data is received again;

after encrypting all real data, the trusted execution environment unit stores it in the local storage unit, computes hash values of all real data at the same time, and signs the hash values, thereby returning the signature of the hash values and the hash values of all real data to the proxy unit, so that a data uploading transaction is generated by the proxy unit according to the signature of the hash values and the hash values of all real data, and is submitted to the blockchain platform module;

the blockchain platform module verifies an authenticity of the data uploading transaction through the consensus mechanism; and if the data uploading transaction is authentic, the data uploading transaction is recorded; otherwise, the data uploading transaction discarded; the data requesting unit constructs a remote attestation generation request containing the digital certificate and the identity identifier, and sends it to the trusted execution environment unit;

after receiving the remote attestation generation request, the trusted execution environment unit verifies the digital certificate and the identity identifier; and if the verification is successful, a remote attestation is generated by using the remote authentication key pair of the trusted execution environment unit and is returned to the data requesting unit; otherwise, the remote authentication generation request is discarded;

the data requesting unit verifies the remote attestation; and if the verification is successful, the data requesting unit generates an original data request according to its own required data and a computation method, and encrypts the original data request by using the public key in the asymmetric encryption key pair of the trusted execution environment unit, so that a data request transaction containing the encrypted original data request is constructed, and is submitted to the blockchain platform module through the data usage blockchain wallet; otherwise, the current data request process is ended;

the blockchain platform module verifies a validity of the data request transaction through the consensus mechanism; and if the verification is successful, a unique number of the data request transaction is generated and the encrypted original data request is extracted from the data request transaction, then a data request message containing the unique number and the encrypted original data request is constructed and sent to the proxy unit; otherwise, the corresponding data request transaction is discarded;

the proxy unit verifies a validity of the data request message; and if the verification is valid, the data request message is forwarded to the trusted execution environment unit, and the original data request is obtained and forwarded to the privacy smart contract unit after the trusted execution environment unit decrypts the encrypted original data request in the data request message using the private key in its own asymmetric encryption key pair;

the privacy smart contract unit determines whether the data requested by the data requesting unit itself is computable data or traceable data according to the original data request; and if the data is computable data, the corresponding required data is searched on the index structure and computed by using a computation method to obtain a processing result; otherwise, the watermark is embedded into the required data by using the watermark key to obtain watermark data, so as to return the watermark data as the processing result to the trusted execution environment unit;

the trusted execution environment unit encrypts the processing result by using the public key in its own asymmetric encryption key pair and signs the encrypted processing result with a private key in its own signature key pair, so that the encrypted and signed processing result is obtained and returned to the proxy unit, and a data response transaction is constructed by the proxy unit by using the encrypted and signed processing result, and is submitted to the blockchain platform module through the cloud service blockchain wallet;

the blockchain platform module confirms a legality of the data response transaction through the consensus mechanism; and if the data response transaction is legal, the data response transaction is recorded; otherwise, the data response transaction is discarded;

the data requesting unit queries the data response transaction from the blockchain platform module and parses the data response transaction to obtain the encrypted and signed processing result;

when the traceable data is leaked, the data tracing unit generates a trace message based on the leaked traceable data, and the trace message is encrypted and then sent to the data receiving units of the t committee oracle modules, respectively;

after decrypting the encrypted trace message, any one of the data receiving units computes a partial sensitive hash of the leaked traceable data, and matches it with the data record; and if all data receiving units match successfully, the trusted execution environment unit encrypts the trace message by using the public key in its own asymmetric encryption key pair to obtain the re-encrypted trace message, and sends it to the proxy unit; otherwise, the current trace process is ended;

the proxy unit verifies the re-encrypted trace message; and if the verification is successful, the re-encrypted trace message is forwarded to the trusted execution environment unit and is decrypted by the trusted execution environment unit to obtain the trace message, which is forwarded to the privacy smart contract unit; otherwise, the re-encrypted trace message is discarded.

after receiving at least t trace messages, the privacy smart contract unit generates a trace ATS aggregate signature and a trace aggregate public key, and verifies the trace ATS aggregate signature by using the trace aggregate public key; and if the verification is successful, the watermark information is extracted from the trace message by using the watermark key and then returned to the trusted execution environment unit; the trusted execution environment unit generates a hash of the watermark information and signs the hash of the watermark information to obtain a watermark signature, thereby returning the watermark signature and the hash of the watermark information to the proxy unit;

the proxy unit constructs a trace transaction by using the watermark signature and the hash of the watermark information and submits it to the blockchain platform module through the cloud service blockchain wallet; and the blockchain platform module verifies an authenticity of the trace transaction through the consensus mechanism; and if the trace transaction is authentic, the trace transaction is recorded; otherwise, the trace transaction is discarded.

A trusted, private, verifiable and traceable data flow method applied in a network environment composed of a data provider, a cloud service provider, n oracles, a data user, a trusted execution environment, a privacy smart contract and a blockchain platform, where the data flow method is carried out according to the following steps:

step 1, system initialization:

step 1.1, selecting t oracles from the n oracles as committee oracles respectively, and the t oracles jointly initialize the blockchain platform, including: setting up a consensus mechanism of the blockchain platform; and the i-th committee oracle generates an i-th asymmetric encryption key pair, an i-th signature key pair and an i-th ATS key pair;

step 1.2, the cloud service provider initializes a proxy unit, the trusted execution environment, and the privacy smart contract, including: setting a cloud service blockchain wallet, generating a remote authentication key pair of the trusted execution environment, an asymmetric encryption key pair of the trusted execution environment, a signature key pair of the trusted execution environment, and establishing an index structure;

the privacy smart contract registers with any one of the committee oracles to obtain a trusted verifiable computation key pair and a watermark key;

step 1.3, the data user generates a data usage asymmetric key pair, obtains a digital certificate and an identity identifier after interacting with the committee oracle, and sets up a data usage blockchain wallet at the same time;

step 1.4, the data provider generates a data providing asymmetric key pair and obtains a verifiable computation key pair after interacting with any one of the committee oracles;

step 2, data collection:

step 2.1, the data provider determines whether held real data belongs to computable data or traceable data; and if the held real data is the computable data, a private key in the verifiable computation key pair is used to perform a verifiable computation signature on the held real data to obtain a verifiable computation signature, then a public key in the asymmetric encryption key pair of the committee oracle is used to encrypt the held real data and the verifiable computation signature together to obtain the processed data; otherwise, the public key in the asymmetric encryption key pair of the committee oracle module is used to directly encrypt the held real data to obtain the processed data; so as to send the processed data to the t committee oracles, respectively;

step 2.2, the i-th committee oracle decrypts the received processed data by using a private key in the i-th asymmetric encryption key pair, so as to obtain the decrypted data, and verify an authenticity of the decrypted data; and if the decrypted data is authentic, the decrypted data is stored as a data record and a public key in the asymmetric encryption key pair of the trusted execution environment is used to perform secondary encryption on the decrypted data, and then a private key in the signature key pair in the committee oracle is used to sign the secondary encrypted data to obtain one-time signature data, and then a private key in the ATS signature key pair of the committee oracle is used to perform an ATS signature on the secondary encrypted data, thereby forming encrypted signature data together with the one-time signature data, and then sending it to the cloud service provider; otherwise, the decrypted data is discarded;

step 2.3, the cloud service provider verifies the encrypted signature data by using a public key in the signature key pair of the committee oracle; and if the verification is successful, the encrypted signature data is forwarded to the trusted execution environment, and after the trusted execution environment decrypts the encrypted signature data by using a private key in its own asymmetric encryption key pair, the real data is obtained and forwarded to the privacy smart contract; otherwise, the encrypted signature data is discarded;

step 2.4, after receiving at least t pieces of real data, the privacy smart contract generates a data ATS aggregation signature and a data aggregation public key, and verifies the data ATS aggregation signature by using the data aggregation public key; and if the verification is successful, all real data is used to update the index structure, and all real data is returned to the trusted execution environment; otherwise, at least t pieces of real data is received again;

step 2.5, the trusted execution environment encrypts and stores all real data, computes hash values of all real data at the same time, and signs the hash values using a private key in its own signature key pair, thereby returning the signature of the hash values and the hash values of all real data to the cloud service provider, so that a data uploading transaction is generated by the cloud service provider according to the signature of the hash values and the hash values of all real data, and is submitted to the blockchain platform;

step 2.6, the blockchain platform verifies an authenticity of the data uploading transaction through the consensus mechanism; and if the data uploading transaction is authentic, the data uploading transaction is recorded; otherwise, the data uploading transaction discarded;

step 3, data requesting:

step 3.1, the data user first constructs a remote attestation generation request containing the digital certificate and the identity identifier and sends it to the trusted execution environment, and the trusted execution environment verifies the digital certificate and the identity identifier after receiving the remote attestation generation request; and if the verification is successful, a remote attestation is generated by using the remote authentication key pair of the trusted execution environment and is returned to the data user; otherwise, the remote authentication generation request is discarded;

step 3.2, the data user verifies the remote attestation; and if the verification is successful, an original data request is generated according to its own required data and a computation method, and the original data request is encrypted by using the public key in the asymmetric encryption key pair of the trusted execution environment unit, so that a data request transaction containing the encrypted original data request is constructed, and is submitted to the blockchain platform through the data usage blockchain wallet; otherwise, the current data request process is ended;

step 3.3, the block chaining platform verifies a validity of the data request transaction through the consensus mechanism, and if the verification is successful, a unique number of the data request transaction is generated and the encrypted original data request is extracted from the data request transaction, then a data request message containing the unique number and the encrypted original data request is constructed and sent to the cloud service provider; otherwise, the corresponding data request transaction is discarded;

step 3.4, the cloud servicer verifies a validity of the data request message, and if the verification is valid, the data request message is forwarded to the trusted execution environment, and the original data request is obtained and forwarded to the privacy smart contract after the trusted execution environment decrypts the encrypted original data request in the data request message using the private key in its own asymmetric encryption key pair;

step 3.5, the privacy smart contract determines whether the data requested by the data user itself is computable data or traceable data according to the original data request; and if the data is computable data, proceed to step 3.6; otherwise, proceed to step 3.7;

step 3.6, after receiving the original data request representing the computable data, the privacy smart contract searches on the index structure to obtain the data required by the data user and computes it by using a computation method, so as to obtain a processing result and send it to the trusted execution environment;

step 3.7, after receiving the original data request representing the traceable data, the privacy smart contract uses the watermark key to perform watermark embedding to obtain watermark data, so as to return the watermark data as the processing result to the trusted execution environment;

step 3.8, the trusted execution environment encrypts the processing result by using the public key in its own asymmetric encryption key pair and signs the encrypted processing result by using the private key in its own signature key pair, so that the encrypted and signed processing result is obtained and returned to the cloud service provider, and a data response transaction is constructed by the cloud service provider by using the encrypted and signed processing result, and is submitted to the blockchain platform through the cloud service blockchain wallet;

step 3.9, the blockchain platform confirms a legality of the data response transaction through the consensus mechanism; and if the data response transaction is legal, the data response transaction is recorded; otherwise, the data response transaction is discarded;

step 3.10, the data user queries the data response transaction from the blockchain platform and parses the data response transaction to obtain the encrypted and signed processing result;

step 4, data tracing:

step 4.1, when the traceable data is leaked, the data user generates a trace message based on the leaked traceable data, and the trace message is encrypted and then sent to the t committee oracle modules, respectively;

step 4.2, after decrypting the encrypted trace message, the i-th committee oracle computes a partial sensitive hash of the leaked traceable data, and matches it with the data record; and if all committee oracles match successfully, the trusted execution environment encrypts the trace message by using the public key in its own asymmetric encryption key pair to obtain the re-encrypted trace message, and sends it to the cloud service provider; otherwise, the current trace process is ended;

step 4.3, the cloud service provider verifies the re-encrypted trace message; and if the verification is successful, the re-encrypted trace message is forwarded to the trusted execution environment and is decrypted by the trusted execution environment to obtain the trace message, and the trace message is forwarded to the privacy smart contract unit; otherwise, the re-encrypted trace message is discarded;

step 4.4, after receiving at least t trace messages, the privacy smart contract generates a trace ATS aggregate signature and a trace aggregate public key, and verifies the trace ATS aggregate signature by using the trace aggregate public key; and if the verification is successful, the watermark information is extracted from the trace message by using the watermark key and then returned to the trusted execution environment; the trusted execution environment generates a hash of the watermark information and signs the hash of the watermark information to obtain a watermark signature, thereby returning the watermark signature and the hash of the watermark information to the cloud service provider;

step 4.5, the cloud service provider constructs a trace transaction by using the watermark signature and the hash of the watermark information and submits it to the blockchain platform through the cloud service blockchain wallet; and step 4.6, the blockchain platform verifies an authenticity of the trace transaction through the consensus mechanism; and if the trace transaction is authentic, the trace transaction is recorded; otherwise, the trace transaction is discarded.

Compared with the prior art, the present invention has the following beneficial effects:

1. The present invention screens the data submitted by individuals or websites through a committee formed by a plurality of decentralized oracles, and records and traces the identity information participating in the notarization behavior of the oracles for further verification and accountability, thereby solving the data issues from the untrusted data providers.

2. The present invention utilizes a trusted execution environment (TEE) and blockchain to connect the data providers and users, store screened data, and respond to tracking requests. Meanwhile, data computation is offloaded from the blockchain to the off-chain TEE in cloud servers by designing a privacy smart contract (PSC), so as to protect privacy and improve the computation efficiency. In combination with a verifiable computation technology, the present invention solves the problem of verifiable computation in an untrusted server environment.

3. The present invention solves the traceability problem of anonymous data users by requiring the data users to submit an identifier to the server and embedding the identifier as a watermark in the request data. Meanwhile, the design mechanism of the present invention prevents untrusted servers from obtaining the identifier, thereby protecting the anonymity of users.

BRIEF DESCRIPTION OF THE DRAWINGS

FIGURE is a block diagram of a trusted, private, verifiable and traceable data flow system of the present invention.

DESCRIPTION OF THE EMBODIMENTS

In the present embodiment, a trusted, private, verifiable and traceable data flow system, as shown in FIGURE, is applied in a network environment composed of a plurality of data providing modules, a cloud service module, a plurality of oracle modules, a plurality of data usage modules and a blockchain platform module. The data providing modules holds data and sends the data to the oracle modules, the oracle modules submit it to the cloud service module after verifying that there is no error, and the cloud service module submits a data collection message to the blockchain platform module in a transaction manner. The data usage modules send a request to a blockchain platform module, and the cloud service module acquires the request from the blockchain platform and provides data to the data usage modules. After data leakage occurs, the data usage modules send a tracing request to the oracle modules, the oracle modules forward it to the cloud service module after verifying the authenticity, and the cloud service module extracts watermarks to perform tracing.

Taking one-time data flow processing as an example, the data providing module are an organization or an individual that holds a set of computable data or picture data, the oracle modules are government or professional institutions that are responsible for data verification and further processing, the cloud service module is a server deployed on the cloud and is responsible for computing or querying the data, the data usage module is an individual or institutional user who obtains query results or computing results from the cloud service module as needed, and the blockchain platform is responsible for recording data interaction process, so as to ensure the authenticity and traceability of the data.

Among them, the data providing module includes a data providing registration unit and a data uploading unit;

the cloud service module includes a cloud service initialization unit, a proxy unit, a trusted execution environment unit, a local storage unit and a privacy smart contract unit;

t oracle modules are selected from the n oracle modules as committee oracle modules respectively, where t represents a threshold value of the committee oracle modules and $t \in [1,n]$, where each of committee oracle modules includes an oracle initialization unit and a data receiving unit;

the data usage module includes a data usage registration unit, a data requesting unit and a data tracing unit.

The oracle initialization units of the t committee oracle modules initialize the blockchain platform module, including: setting up a consensus mechanism of the blockchain platform module; and at the same time, the i-th oracle initialization unit generates an asymmetric encryption key pair, a signature key pair and an ATS signature key pair of the i-th committee oracle module.

The cloud service initialization unit initializes the proxy unit, the trusted execution environment unit, the local storage unit and the privacy smart contract unit, including: setting a cloud service blockchain wallet, and generating a remote authentication key pair of the trusted execution environment unit, an asymmetric encryption key pair of the trusted execution environment unit, a signature key pair of the trusted execution environment unit and an index structure of the local storage unit;

the privacy smart contract unit registers with any one of the committee oracle modules to obtain a trusted verifiable computation key pair and a watermark key; and the data usage registration unit generates a data usage asymmetric key pair, obtains a digital certificate and an identity identifier after interacting with the oracle initialization unit of any one of the committee oracle modules, and sets up a data usage blockchain wallet at the same time.

The data providing registration unit generates a data providing asymmetric key pair, and obtains a verifiable computation key pair after interacting with any one of the oracle initialization units; and the data uploading unit determines whether held real data belongs to computable data or traceable data; and if the data is the computable data, a private key in the verifiable computation key pair is used to perform a verifiable computation signature on the held real data to obtain a verifiable computation signature, then a public key in the asymmetric encryption key pair of the committee oracle module is used to encrypt the held real data and the verifiable computation signature together to obtain the processed data; otherwise, the public key in the asymmetric encryption key pair of the committee oracle module is used to directly encrypt the held real data to obtain the processed data; so as to send the processed data to the data receiving unit.

The data receiving unit decrypts the received processed data by using a private key in the asymmetric encryption key pair of the committee oracle module, so as to obtain the decrypted data, and verify the authenticity of the decrypted data; and if it is authentic, the decrypted data is stored as a data record and a public key in the asymmetric encryption key pair of the trusted execution environment unit is used to perform secondary encryption on the decrypted data, and then a private key in the signature key pair in the committee oracle module is used to sign the secondary encrypted data, so as to obtain one-time signature data, and then a private key in the ATS signature key pair of the committee oracle module is used to perform an ATS signature on the secondary encrypted data, thereby forming encrypted signature data together with the one-time signature data, which is then sent to the proxy unit; otherwise, the decrypted data is discarded.

The proxy unit verifies the encrypted signature data by using a public key in the signature key pair of the committee oracle module; and if the verification is successful, the encrypted signature data is forwarded to the trusted execution environment unit, and the trusted execution environment unit decrypts the encrypted signature data using the private key in its own asymmetric encryption key pair to obtain the real data, which is then forwarded to the privacy smart contract unit; otherwise, the encrypted signature data is discarded.

After receiving at least t pieces of real data, the privacy smart contract unit generates a data ATS aggregation signature and a data aggregation public key and verifies the data ATS aggregation signature by using the data aggregation public key; and if the verification is successful, all real data is used to update the index structure of the local storage unit, and all real data is returned to the trusted execution environment unit; otherwise, at least t pieces of real data is received again.

After encrypting all real data, the trusted execution environment unit stores it in the local storage unit, and computes hash values of all real data at the same time and signs the hash values, thereby returning the signature of the hash values and the hash values of all real data to the proxy unit, so that a data uploading transaction is generated by the proxy unit according to the signature of the hash values and the hash values of all real data, and is submitted to the blockchain platform module.

The blockchain platform module verifies the authenticity of the data uploading transaction through the consensus mechanism; and if it is authentic, the data uploading transaction is recorded; otherwise, the data uploading transaction discarded;

the data requesting unit constructs a remote attestation generation request containing the digital certificate and the identity identifier and sends it to the trusted execution environment unit.

After receiving the remote attestation generation request, the trusted execution environment unit verifies the digital certificate and the identity identifier; and if the verification is successful, a remote attestation is generated by using the remote authentication key pair of the trusted execution environment unit and is returned to the data requesting unit; otherwise, the remote authentication generation request is discarded.

The data requesting unit verifies the remote attestation, and if the verification is successful, the data requesting unit generates an original data request according to its own required data and computation method, and encrypts the original data request by using the public key in the asymmetric encryption key pair of the trusted execution environment unit, so that a data request transaction containing the encrypted original data request is constructed, and is submitted to the blockchain platform module through the data usage blockchain wallet; otherwise, the current data request process is ended.

The blockchain platform module verifies the validity of the data request transaction through the consensus mechanism, and if the verification is successful, a unique number of the data request transaction is generated and the encrypted original data request is extracted from the data request transaction, and then a data request message containing the unique number and the encrypted original data request is constructed and sent to the proxy unit; otherwise, the corresponding data request transaction is discarded.

The proxy unit verifies the validity of the data request message, and if the verification is valid, the data request message is forwarded to the trusted execution environment unit, and the original data request is obtained and forwarded to the privacy smart contract unit after the trusted execution environment unit decrypts the encrypted original data request in the data request message using the private key in its own asymmetric encryption key pair; and the privacy smart contract unit determines whether the data requested by the data requesting unit itself is computable data or traceable data according to on the original data request; and if it is computable data, the corresponding required data is searched on the index structure and is computed to obtain a processing result; otherwise, a watermark is embedded into the required data through the watermark key to obtain watermark data, so as to return the watermark data as the processing result to the trusted execution environment unit.

The trusted execution environment unit encrypts the processing result by using the public key in its own asymmetric encryption key pair and signs the encrypted processing result with the private key in its own signature key pair, so that the encrypted and signed processing result is obtained and returned to the proxy unit, and the proxy unit constructs a data response transaction by using the encrypted and signed processing result and submits it to the blockchain platform module through the cloud service blockchain wallet.

The blockchain platform module confirms the legality of the data response transaction through the consensus mechanism; and if it is legal, the data response transaction is recorded; otherwise, the data response transaction is discarded;

the data requesting unit queries the data response transaction from the blockchain platform module and parses the data response transaction to obtain the encrypted and signed processing result; and when the traceable data is leaked, the data tracing unit generates a trace message based on the leaked traceable data, and the trace message is then encrypted and sent to each of the data receiving units of the t committee oracle modules, respectively.

After decrypting the encrypted trace message, any one of the data receiving units computes a partial sensitive hash of the leaked traceable data, and matches it with the data record; and if all data receiving units match successfully, the trusted execution environment unit encrypts the trace message with the public key in its own asymmetric encryption key pair to obtain a re-encrypted trace message and sends it to the proxy unit; otherwise, the current trace process is ended; and the proxy unit verifies the re-encrypted trace message; and if the verification is successful, the re-encrypted trace message is forwarded to the trusted execution environment unit and is decrypted by the trusted execution environment unit to obtain the trace message, and the trace message is forwarded to the privacy smart contract unit; otherwise, the re-encrypted trace message is discarded.

After receiving at least t trace messages, the privacy smart contract unit generates a trace ATS aggregate signature and a trace aggregate public key, and verifies the trace ATS aggregate signature by using the trace aggregate public key; and if the verification is successful, the watermark information is extracted from the trace message by using the watermark key and then returned to the trusted execution environment unit; the trusted execution environment unit generates a hash of the watermark information and signs the hash of the watermark information to obtain a watermark signature, thereby returning the watermark signature and the hash of the watermark information to the proxy unit.

The proxy unit constructs a trace transaction by using the watermark signature and the hash of the watermark information and submits it to the blockchain platform module through the cloud service blockchain wallet; and the blockchain platform module verifies the authenticity of the trace transaction through the consensus mechanism; and if it is authentic, the trace transaction is recorded; otherwise, the trace transaction is discarded.

In a specific implementation, in a trusted, private, verifiable and traceable data flow method, a data provider encrypts the held data and provides it to the oracles. After verifying the authenticity, the oracles forward it to a cloud service provider. The cloud service provider stores the result, a data user submits a request to a blockchain platform, and the cloud service provider obtains the request from the blockchain platform, queries or computes according to the request, encrypts the result and submits it to the block chain platform. The data user obtains the result from the blockchain platform. The data user submits the data to be queried to the oracles during data tracing, the oracles confirm the leak and forward same to the cloud service provider and the cloud service provider extracts the watermark of the leakers for tracing.

In this embodiment, a trusted, private, verifiable and traceable data flow method is applied in a network environment composed of a data provider, a cloud service provider, n oracles, a data user and a blockchain platform, and is carried out in the following steps.

Step 1, System Initialization

Step 1.1, selecting t oracles from the n oracles as committee oracles $\{\mathcal{O}_1, \ldots, \mathcal{O}_i, \ldots, \mathcal{O}_t\}$ respectively, which are responsible for data authentication, where $\mathcal{O}_i$ represents the i-th oracle. The t committee oracles jointly initialize the blockchain platform, including: setting up a consensus mechanism of the blockchain platform;

the i-th committee oracle generates an i-th asymmetric encryption key pair $$(pk_i^{enc}, sk_i^{enc}),$$

an i-th signature key pair $$(pk_i^{sig}, sk_i^{sig})$$

and an i-th ATS key pair $$(pk_i^{ats}, sk_i^{ats}).$$

Step 1.2, the cloud service provider initializes a proxy unit, a trusted execution environment, and a privacy smart contract, including: setting a cloud service blockchain wallet $W_P$ with a public-private key pair $$(pk_p^{wal}, sk_p^{wal}),$$

generating a remote authentication key pair $$(pk_E^{att}, sk_E^{att})$$

of the trusted execution environment unit, an assymetric encryption key pair $$(pk_E^{att}, sk_E^{att})$$

of the trusted execution environment unit, a signature key pair $$(pk_E^{sig}, sk_E^{sig})$$

of the trusted execution environment unit, and establishing an index structure; the trusted execution environment runs in an encrypted memory area provided by Intel SGX; and the privacy smart contract registers with any one of the committee oracles to obtain a trusted verifiable computation key pair ($ssk_{psc}$, $vk_{psc}$) and a watermark key wk; the privacy smart contract relies on an Ethereum virtual machine embedded in a trusted execution environment (TEE) to run, so as to achieve privacy protection and secure computing.

Step 1.3, the data user generates a data usage asymmetric key pair ($pk_{du}$, $sk_{du}$), obtains a digital certificate and an identity identifier after interacting with the committee oracle, and sets up a data usage blockchain wallet $\mathcal{W}_{du}$ with a public-private key pair $$(pk_{du}^{wal}, sk_{du}^{wal})$$

at the same time.

Step 1.4, the data provider generates a data providing asymmetric key pair ($pk_{dp}$, $sk_{dp}$) and obtains a verifiable computation key pair ($sk_{dp}$, $vk_{dp}$) after interacting with any one of the committee oracles.

Step 2, Data Collection

Step 2.1, the data provider determines whether held real data belongs to computable data or traceable data; and if it is the computable data, a private key $sk_{dp}$ in the verifiable computation key pair is used to perform a verifiable computation signature on the held real data to obtain a verifiable computation signature, and a public key $$pk_i^{enc}$$

in the asymmetric encryption key pair of the committee oracle module is then used to encrypt the held real data and the verifiable computation signature together to obtain the processed data; otherwise, the public key $$pk_i^{enc}$$

in the asymmetric encryption key pair of the committee oracle module is used to directly encrypt the held real data to obtain the processed data; so as to send the processed data to t committee oracles $\{\mathcal{O}_1, \ldots, \mathcal{O}_i, \ldots, \mathcal{O}_t\}$ respectively.

Step 2.2, the i-th committee oracle uses the private key $$sk_i^{enc}$$

in the i-th asymmetric encryption key pair to decrypt the received processed data to obtain the decrypted data, and verify an authenticity of the decrypted data; and if it is authentic, the decrypted data is stored as a data record and a public key $$pk_E^{att}$$

in the assymetric encryption key pair of the trusted execution environment is used to perform secondary encryption on the decrypted data, and a private key $$sk_i^{sig}$$

in the signature key pair in the committee oracle is then used to sign the secondary encrypted data to obtain one-time signature data, and then a private key $$sk_i^{ats}$$

in the ATS siganture key pair of the committee oracle is used to perform an ATS signature on the secondary encrypted data, thereby forming encrypted signature data together with the one-time signature data, and then sending it to the cloud service provider; otherwise, the decrypted data is discarded.

Step 2.3, the cloud service provider verifies the encrypted signature data by using a public key $$pk_i^{sig}$$

in the signature key pair of the committee oracle; and if the verification is successful, the encrypted signature data is forwarded to the trusted execution environment, and the real data is obtained and forwarded to the privacy smart contract after the trusted execution environment decrypts the encrypted signature data by using private key $$sk_E^{enc}$$

in its own asymmetric encryption key pair; otherwise, the encrypted signature data is discarded.

Step 2.4, after receiving at least t pieces of real data, the privacy smart contract generates a data ATS aggregation signature $$\sigma_{data}^{ats}$$

and a data aggregation public key $pk_{data}$, and verifies the data ATS aggregation signature by using the data aggregation public key $pk_{data}$; and if the verification is successful, all real data is used to update the index structure, and is returned to the trusted execution environment; otherwise, at least t pieces of real data is received again.

Step 2.5, the trusted execution environment encrypts and stores all real data, computes hash values of all real data at the same time, and signs the hash values using a private key $$sk_E^{sig}$$

in its own signature key pair, thereby returning the signature of the hash values and the hash values of all real data to the cloud service provider, so that a data uploading transaction is generated by the cloud service provider according to the signature of the hash values and the hash values of all real data, and is submitted to the blockchain platform.

Step 2.6, the blockchain platform verifies an authenticity of the data uploading transaction through the consensus mechanism; and if it is authentic, the data uploading transaction is recorded; otherwise, the data uploading transaction discarded.

Step 3, Data Requesting

Step 3.1, the data user first constructs a remote attestation generation request containing the digital certificate and the identity identifier and sends it to the trusted execution environment, and the trusted execution environment verifies the digital certificate and the identity identifier after receiving the remote attestation generation request; and if the verification is successful, a remote attestation is generated by using the remote authentication key pair $$(pk_E^{att}, sk_E^{att})$$

of the trusted execution environment and is returned to the data user; otherwise, the remote authentication generation request is discarded.

Step 3.2, the data user verifies the remote attestation, and if the verification is successful, an original data request is generated according to its own required data and a computation method f, and the original data request is encrypted by using the public key $pk_E^{enc}$ in the asymmetric encryption key pair of the trusted execution environment, so that a data request transaction containing the encrypted original data request is constructed, and is submitted to the blockchain platform through the data usage blockchain wallet $\mathcal{W}au$; otherwise, the current data request process is ended.

Step 3.3, the block chaining platform verifies a validity of the data request transaction through the consensus mechanism, and if the verification is successful, a unique number of the data request transaction is generated and the encrypted original data request is extracted from the data request transaction, and then a data request message containing the unique number and the encrypted original data request is constructed and sent to the proxy; otherwise, the corresponding data request transaction is discarded.

Step 3.4, the cloud servicer verifies a validity of the data request message, and if the verification is valid, the data request message is forwarded to the trusted execution environment, and the original data request is obtained and forwarded to the privacy smart contract after the trusted execution environment decrypts the encrypted original data request in the data request message using the private key $sk_E^{enc}$ in its own asymmetric encryption key pair.

Step 3.5, the privacy smart contract determines whether the data requested by the data user itself is computable data or traceable data according to the original data request; and if it is computable data, proceed to Step 3.6; otherwise, proceed to Step 3.7.

Step 3.6, after receiving the original data request representing the computable data, the privacy smart contract searches on the index structure to obtain the dataset required by the data user $D=\{D_1, D_2, \ldots, D_q \ldots, D_Q\}$, where $D_q$ represents the q-th data item, and $D_q=\{d_{q1}, d_{q2}, \ldots, d_{qj}, \ldots, D_{qJ_q}\}$, $d_{aj}$ represents the j-th data in $D_q$, Q represents the total number of data items contained in dataset D, and $J_q$ represents the total number of data in $D_q$; and computes it by using a computation method f, so as to obtain a processing result and send it to the trusted execution environment.

Step 3.7, after receiving the original data request representing the traceable data, the privacy smart contract uses the watermark key wk to perform watermark embedding to obtain watermark data, so as to return the watermark data as the processing result to the trusted execution environment;

Step 3.8, the trusted execution environment encrypts the processing result by using the public key $pk_E^{enc}$ of its own asymmetric encryption key pair and signs the encrypted processing result by using the private key $sk_E^{sig}$ of its own signature key pair, so that the encrypted and signed processing result is obtained and returned to the cloud service provider, and a data response transaction is constructed by the cloud service provider by using the encrypted and signed processing result, and is submitted to the blockchain platform through the cloud service blockchain wallet $\mathcal{W}_p$.

Step 3.9, the blockchain platform confirms a legality of the data response transaction through the consensus mechanism; and if it is legal, the data response transaction is recorded; otherwise, the data response transaction is discarded.

Step 3.10, the data user queries the data response transaction from the blockchain platform and parses the data response transaction to obtain the encrypted and signed processing result.

Step 4, Data Tracing

Step 4.1, when the traceable data is leaked, the data user generates a trace message based on the leaked traceable data and encrypts it, and sends it to the t committee oracles $\{\mathcal{O}_1, \ldots, \mathcal{O}_i, \ldots, \mathcal{O}_t\}$, respectively.

Step 4.2, after decrypting the encrypted trace message, the i-th committee oracle $\mathcal{O}_i$ computes a partial sensitive hash of the leaked traceable data, and matches it with the data record; and if all committee oracles match successfully, the trusted execution environment encrypts the trace message by using the public key in its own asymmetric encryption key pair to obtain the re-encrypted trace message, and sends it to the cloud service provider; otherwise, the current trace process is ended.

Step 4.3, the cloud service provider verifies the re-encrypted trace message; and if the verification is successful, the re-encrypted trace message is forwarded to the trusted execution environment and is decrypted by the trusted execution environment to obtain the trace message, and the trace message is forwarded to the privacy smart contract; otherwise, the re-encrypted trace message is discarded.

Step 4.4, after receiving at least t trace messages, the privacy smart contract generates a trace ATS aggregate signature $\sigma_{tra}^{ats}$ and a trace aggregate public key $pk_{tra}$, and verifies the trace ATS aggregate signature by using the trace aggregate public key; and if the verification is successful, the watermark information is extracted from the trace message by using the watermark key wk and then returned to the trusted execution environment; the trusted execution environment generates a hash of the watermark information and signs the hash of the watermark information to obtain a watermark signature, thereby returning the watermark signature and the hash of the watermark information to the cloud service provider.

Step 4.5, the cloud service provider constructs a trace transaction by using the watermark signature and the hash of the watermark information and submits it to the blockchain platform through the cloud service blockchain wallet.

Step 4.6, the blockchain platform verifies an authenticity of the trace transaction through the consensus mechanism; and if it is authentic, the trace transaction is recorded; otherwise, the trace transaction is discarded.

In summary, the present invention makes improvements on the basis of solving authenticated data flow, so as to solve the data problems from untrusted data providers, the verifiable computation problem under untrusted servers, and the traceability problem for anonymous data users, thereby realizing a trusted, private, verifiable and traceable data flow method and system, and ensuring the secure and trusted flow of data elements.

What is claimed is:

1. A trusted, private, verifiable and traceable data flow system, comprising: a data providing processor, a cloud service processor, n oracle processors, a data usage processor, and a blockchain platform processor; and t oracle processors are selected from the n oracle processors as committee oracle processors respectively, wherein n is an integer greater than 1, and t represents a threshold value of the committee oracle processors and t∈[1,n];

the data providing processor comprises a data providing registration processor and a data uploading processor;

the cloud service processor comprises a cloud service initialization processor, a proxy processor, a trusted execution environment processor, a local storage processor and a privacy smart contract processor;

each of the committee oracle processors comprises an oracle initialization processor and a data receiving processor;

the data usage processor comprises a data usage registration processor, a data requesting processor and a data tracing processor;

the oracle initialization processors of the t committee oracle processors initialize the blockchain platform processor, comprising: setting up a consensus mechanism of the blockchain platform processor; and at the same time, the i-th oracle initialization processor generates an asymmetric encryption key pair, a signature key pair and an accountable threshold signature (ATS) key pair of the i-th committee oracle processor;

the cloud service initialization processor initializes the proxy processor, the trusted execution environment processor, the local storage processor and the privacy smart contract processor, comprising: setting a cloud service blockchain wallet, and generating a remote authentication key pair of the trusted execution environment processor, an asymmetric encryption key pair of the trusted execution environment processor, a signature key pair of the trusted execution environment unit and an index structure of the local storage processor;

the privacy smart contract processor registers with any one of the committee oracle processors to obtain a trusted verifiable computation key pair and a watermark key;

the data usage registration processor generates a data usage asymmetric key pair, obtains a digital certificate and an identity identifier after interacting with the oracle initialization processor of any one of the committee oracle processors, and sets up a data usage blockchain wallet at the same time;

the data providing registration processor generates a data providing asymmetric key pair, and obtains a verifiable computation key pair after interacting with any one of the oracle initialization processors;

the data uploading processor determines whether held real data belongs to computable data or traceable data; and if the data is the computable data, a private key in the verifiable computation key pair is used to perform a verifiable computation signature on the held real data to obtain a verifiable computation signature, then a public key in the asymmetric encryption key pair of the committee oracle processor is used to encrypt the held real data and the verifiable computation signature together to obtain the processed data; otherwise, the public key in the asymmetric encryption key pair of the committee oracle processor is used to directly encrypt the held real data to obtain the processed data; so as to send the processed data to the data receiving processor;

the data receiving processor decrypts the received processed data by using a private key in the asymmetric encryption key pair of the committee oracle processor, so as to obtain the decrypted data, and verify an authenticity of the decrypted data; and if the decrypted data is authentic, the decrypted data is stored as a data record and a public key in the asymmetric encryption key pair of the trusted execution environment processor is used to perform secondary encryption on the decrypted data, and then a private key in the signature key pair in the committee oracle processor is used to sign the secondary encrypted data, so as to obtain one-time signature data, and then a private key in the ATS signature key pair of the committee oracle processor is used to perform an ATS signature on the secondary encrypted data, thereby forming encrypted signature data together with the one-time signature data, which is then sent to the proxy processor; otherwise, the decrypted data is discarded;

the proxy processor verifies the encrypted signature data by using a public key in the signature key pair of the committee oracle processor; and if the verification is successful, the encrypted signature data is forwarded to the trusted execution environment processor, and after the trusted execution environment processor decrypts the encrypted signature data using a private key in its own asymmetric encryption key pair, the real data is obtained and forwarded to the privacy smart contract processor; otherwise, the encrypted signature data is discarded;

after receiving at least t pieces of real data, the privacy smart contract processor generates a data ATS aggregation signature and a data aggregation public key and verifies the data ATS aggregation signature by using the data aggregation public key; and if the verification is successful, all real data is used to update the index structure of the local storage processor, and all real data is returned to the trusted execution environment processor; otherwise, at least t pieces of real data is received again;

after encrypting all real data, the trusted execution environment processor stores all real data in the local storage processor, computes hash values of all real data at the same time, and signs the hash values, thereby returning the signature of the hash values and the hash values of all real data to the proxy processor, so that a data uploading transaction is generated by the proxy processor according to the signature of the hash values and the hash values of all real data, and is submitted to the blockchain platform processor;

the blockchain platform processor verifies an authenticity of the data uploading transaction through the consensus mechanism; and if the data uploading transaction is authentic, the data uploading transaction is recorded; otherwise, the data uploading transaction discarded;

the data requesting processor constructs a remote attestation generation request containing the digital certificate and the identity identifier, and sends the remote attestation generation request to the trusted execution environment processor;

after receiving the remote attestation generation request, the trusted execution environment processor verifies the digital certificate and the identity identifier; and if the verification is successful, a remote attestation is generated by using the remote authentication key pair of the trusted execution environment processor and is returned to the data requesting processor; otherwise, the remote authentication generation request is discarded;

the data requesting processor verifies the remote attestation; and if the verification is successful, the data requesting processor generates an original data request according to its own required data and a computation method, and encrypts the original data request by using the public key in the asymmetric encryption key pair of the trusted execution environment processor, so that a data request transaction containing the encrypted original data request is constructed, and is submitted to the blockchain platform processor through the data usage blockchain wallet; otherwise, the current data request process is ended;

the blockchain platform processor verifies a validity of the data request transaction through the consensus mechanism; and if the verification is successful, a unique number of the data request transaction is generated and the encrypted original data request is extracted from the data request transaction, then a data request message containing the unique number and the encrypted original data request is constructed and sent to the proxy processor; otherwise, the corresponding data request transaction is discarded;

the proxy processor verifies a validity of the data request message; and if the verification is valid, the data request message is forwarded to the trusted execution environment processor, and the original data request is obtained and forwarded to the privacy smart contract processor after the trusted execution environment processor decrypts the encrypted original data request in the data request message using the private key in its own asymmetric encryption key pair;

the privacy smart contract processor determines whether the data requested by the data requesting processor itself is computable data or traceable data according to the original data request; and if the data is computable data, the corresponding required data is searched on the index structure and computed by using a computation method to obtain a processing result; otherwise, the watermark is embedded into the required data by using the watermark key to obtain watermark data, so as to return the watermark data as the processing result to the trusted execution environment processor;

the trusted execution environment processor encrypts the processing result by using the public key in its own asymmetric encryption key pair and signs the encrypted processing result with a private key in its own signature key pair, so that the encrypted and signed processing result is obtained and returned to the proxy processor, and a data response transaction is constructed by the proxy processor by using the encrypted and signed processing result, and is submitted to the blockchain platform processor through the cloud service blockchain wallet;

the blockchain platform processor confirms a legality of the data response transaction through the consensus mechanism; and if the data response transaction is legal, the data response transaction is recorded; otherwise, the data response transaction is discarded;

the data requesting processor queries the data response transaction from the blockchain platform processor and parses the data response transaction to obtain the encrypted and signed processing result;

when the traceable data is leaked, the data tracing processor generates a trace message based on the leaked traceable data, and the trace message is encrypted and then sent to the data receiving processors of the t committee oracle processors, respectively;

after decrypting the encrypted trace message, any one of the data receiving processors computes a partial sensitive hash of the leaked traceable data, and matches the partial sensitive hash of the leaked traceable data with the data record; and if all data receiving processors match successfully, the trusted execution environment processor encrypts the trace message by using the public key in its own asymmetric encryption key pair to obtain the re-encrypted trace message, and sends the re-encrypted trace message to the proxy processor; otherwise, the current trace process is ended;

the proxy processor verifies the re-encrypted trace message; and if the verification is successful, the re-encrypted trace message is forwarded to the trusted execution environment processor and is decrypted by the trusted execution environment processor to obtain the trace message, which is forwarded to the privacy smart contract processor; otherwise, the re-encrypted trace message is discarded;

after receiving at least t trace messages, the privacy smart contract processor generates a trace ATS aggregate signature and a trace aggregate public key, and verifies the trace ATS aggregate signature by using the trace aggregate public key; and if the verification is successful, the watermark information is extracted from the trace message by using the watermark key and then returned to the trusted execution environment processor; the trusted execution environment processor generates a hash of the watermark information and signs the hash of the watermark information to obtain a watermark signature, thereby returning the watermark signature and the hash of the watermark information to the proxy processor;

the proxy processor constructs a trace transaction by using the watermark signature and the hash of the watermark information and submits the trace transaction to the blockchain platform processor through the cloud service blockchain wallet; and the blockchain platform processor verifies an authenticity of the trace transaction through the consensus mechanism; and if the trace transaction is authentic, the trace transaction is recorded; otherwise, the trace transaction is discarded.

2. A trusted, private, verifiable and traceable data flow method applied in a network environment composed of a data provider, a cloud service provider, n oracles, a data user, a trusted execution environment, wherein n is an integer greater than 1, a privacy smart contract and a blockchain platform, wherein the data flow method is carried out according to the following steps:

step 1, system initialization:

step 1.1, selecting t oracles from the n oracles as committee oracles respectively, and the t oracles jointly initialize the blockchain platform, comprising: setting up a consensus mechanism of the blockchain platform; and the i-th committee oracle generates an i-th asymmetric encryption key pair, an i-th signature key pair and an i-th accountable threshold signature (ATS) key pair;

step 1.2, the cloud service provider initializes a proxy processor, the trusted execution environment, and the privacy smart contract, comprising: setting a cloud service blockchain wallet, generating a remote authentication key pair of the trusted execution environment, an asymmetric encryption key pair of the trusted execution environment, a signature key pair of the trusted execution environment, and establishing an index structure;

the privacy smart contract registers with any one of the committee oracles to obtain a trusted verifiable computation key pair and a watermark key;

step 1.3, the data user generates a data usage asymmetric key pair, obtains a digital certificate and an identity identifier after interacting with the committee oracle, and sets up a data usage blockchain wallet at the same time;

step 1.4, the data provider generates a data providing asymmetric key pair and obtains a verifiable computation key pair after interacting with any one of the committee oracles;

step 2, data collection:

step 2.1, the data provider determines whether held real data belongs to computable data or traceable data; and if the held real data is the computable data, a private key in the verifiable computation key pair is used to perform a verifiable computation signature on the held real data to obtain a verifiable computation signature, then a public key in the asymmetric encryption key pair of the committee oracle is used to encrypt the held real data and the verifiable computation signature together to obtain the processed data; otherwise, the public key in the asymmetric encryption key pair of the committee oracle processor is used to directly encrypt the held real data to obtain the processed data; so as to send the processed data to the t committee oracles, respectively;

step 2.2, the i-th committee oracle decrypts the received processed data by using a private key in the i-th asymmetric encryption key pair, so as to obtain the decrypted data, and verify an authenticity of the decrypted data; and if the decrypted data is authentic, the decrypted data is stored as a data record and a public key in the asymmetric encryption key pair of the trusted execution environment is used to perform secondary encryption on the decrypted data, and then a private key in the signature key pair in the committee oracle is used to sign the secondary encrypted data to obtain one-time signature data, and then a private key in the ATS signature key pair of the committee oracle is used to perform an ATS signature on the secondary encrypted data, thereby forming encrypted signature data together with the one-time signature data, and then sending the encrypted signature data to the cloud service provider; otherwise, the decrypted data is discarded;

step 2.3, the cloud service provider verifies the encrypted signature data by using a public key in the signature key pair of the committee oracle; and if the verification is successful, the encrypted signature data is forwarded to the trusted execution environment, and after the trusted execution environment decrypts the encrypted signature data by using a private key in its own asymmetric encryption key pair, the real data is obtained and forwarded to the privacy smart contract; otherwise, the encrypted signature data is discarded;

step 2.4, after receiving at least t pieces of real data, the privacy smart contract generates a data ATS aggregation signature and a data aggregation public key, and verifies the data ATS aggregation signature by using the data aggregation public key; and if the verification is successful, all real data is used to update the index structure, and all real data is returned to the trusted execution environment; otherwise, at least t pieces of real data is received again;

step 2.5, the trusted execution environment encrypts and stores all real data, computes hash values of all real data at the same time, and signs the hash values using a private key in its own signature key pair, thereby returning the signature of the hash values and the hash values of all real data to the cloud service provider, so that a data uploading transaction is generated by the cloud service provider according to the signature of the hash values and the hash values of all real data, and is submitted to the blockchain platform;

step 2.6, the blockchain platform verifies an authenticity of the data uploading transaction through the consensus mechanism; and if the data uploading transaction is authentic, the data uploading transaction is recorded; otherwise, the data uploading transaction discarded;

step 3, data requesting:

step 3.1, the data user first constructs a remote attestation generation request containing the digital certificate and the identity identifier and sends the remote attestation generation request to the trusted execution environment, and the trusted execution environment verifies the digital certificate and the identity identifier after receiving the remote attestation generation request; and if the verification is successful, a remote attestation is generated by using the remote authentication key pair of the trusted execution environment and is returned to the data user; otherwise, the remote authentication generation request is discarded;

step 3.2, the data user verifies the remote attestation; and if the verification is successful, an original data request is generated according to its own required data and a computation method, and the original data request is encrypted by using the public key in the asymmetric encryption key pair of the trusted execution environment processor, so that a data request transaction containing the encrypted original data request is constructed, and is submitted to the blockchain platform through the data usage blockchain wallet; otherwise, the current data request process is ended;

step 3.3, the block chaining platform verifies a validity of the data request transaction through the consensus mechanism, and if the verification is successful, a unique number of the data request transaction is generated and the encrypted original data request is extracted from the data request transaction, then a data request message containing the unique number and the encrypted original data request is constructed and sent to the cloud service provider; otherwise, the corresponding data request transaction is discarded;

step 3.4, the cloud servicer verifies a validity of the data request message, and if the verification is valid, the data request message is forwarded to the trusted execution environment, and the original data request is obtained and forwarded to the privacy smart contract after the trusted execution environment decrypts the encrypted original data request in the data request message using the private key in its own asymmetric encryption key pair;

step 3.5, the privacy smart contract determines whether the data requested by the data user itself is computable data or traceable data according to the original data request; and if the data is computable data, proceed to step 3.6; otherwise, proceed to step 3.7;

step 3.6, after receiving the original data request representing the computable data, the privacy smart contract searches on the index structure to obtain the data required by the data user and computes the data required by the data user by using a computation method, so as to obtain a processing result and send the processing result to the trusted execution environment;

step 3.7, after receiving the original data request representing the traceable data, the privacy smart contract uses the watermark key to perform watermark embedding to obtain watermark data, so as to return the watermark data as the processing result to the trusted execution environment;

step 3.8, the trusted execution environment encrypts the processing result by using the public key in its own asymmetric encryption key pair and signs the encrypted processing result by using the private key in its own signature key pair, so that the encrypted and signed processing result is obtained and returned to the cloud service provider, and a data response transaction is constructed by the cloud service provider by using the encrypted and signed processing result, and is submitted to the blockchain platform through the cloud service blockchain wallet;

step 3.9, the blockchain platform confirms a legality of the data response transaction through the consensus mechanism; and if the data response transaction is legal, the data response transaction is recorded; otherwise, the data response transaction is discarded;

step 3.10, the data user queries the data response transaction from the blockchain platform and parses the data response transaction to obtain the encrypted and signed processing result;

step 4, data tracing:

step 4.1, when the traceable data is leaked, the data user generates a trace message based on the leaked traceable data, and the trace message is encrypted and then sent to the t committee oracle processors, respectively;

step 4.2, after decrypting the encrypted trace message, the i-th committee oracle computes a partial sensitive hash of the leaked traceable data, and matches the partial sensitive hash of the leaked traceable data with the data record; and if all committee oracles match successfully, the trusted execution environment encrypts the trace message by using the public key in its own asymmetric encryption key pair to obtain the re-encrypted trace message, and sends the re-encrypted trace message to the cloud service provider; otherwise, the current trace process is ended;

step 4.3, the cloud service provider verifies the re-encrypted trace message; and if the verification is successful, the re-encrypted trace message is forwarded to the trusted execution environment and is decrypted by the trusted execution environment to obtain the trace message, and the trace message is forwarded to the privacy smart contract processor; otherwise, the re-encrypted trace message is discarded;

step 4.4, after receiving at least t trace messages, the privacy smart contract generates a trace ATS aggregate signature and a trace aggregate public key, and verifies the trace ATS aggregate signature by using the trace aggregate public key; and if the verification is successful, the watermark information is extracted from the trace message by using the watermark key and then returned to the trusted execution environment; the trusted execution environment generates a hash of the watermark information and signs the hash of the watermark information to obtain a watermark signature, thereby returning the watermark signature and the hash of the watermark information to the cloud service provider;

step 4.5, the cloud service provider constructs a trace transaction by using the watermark signature and the hash of the watermark information and submits the trace transaction to the blockchain platform through the cloud service blockchain wallet; and step 4.6, the blockchain platform verifies an authenticity of the trace transaction through the consensus mechanism; and if the trace transaction is authentic, the trace transaction is recorded; otherwise, the trace transaction is discarded.

* * * * *